Feb. 17, 1931.  O. BOYER  1,793,385
SEED AND GRAIN SCARIFIER AND CLEANER
Filed March 1, 1928  3 Sheets-Sheet 1
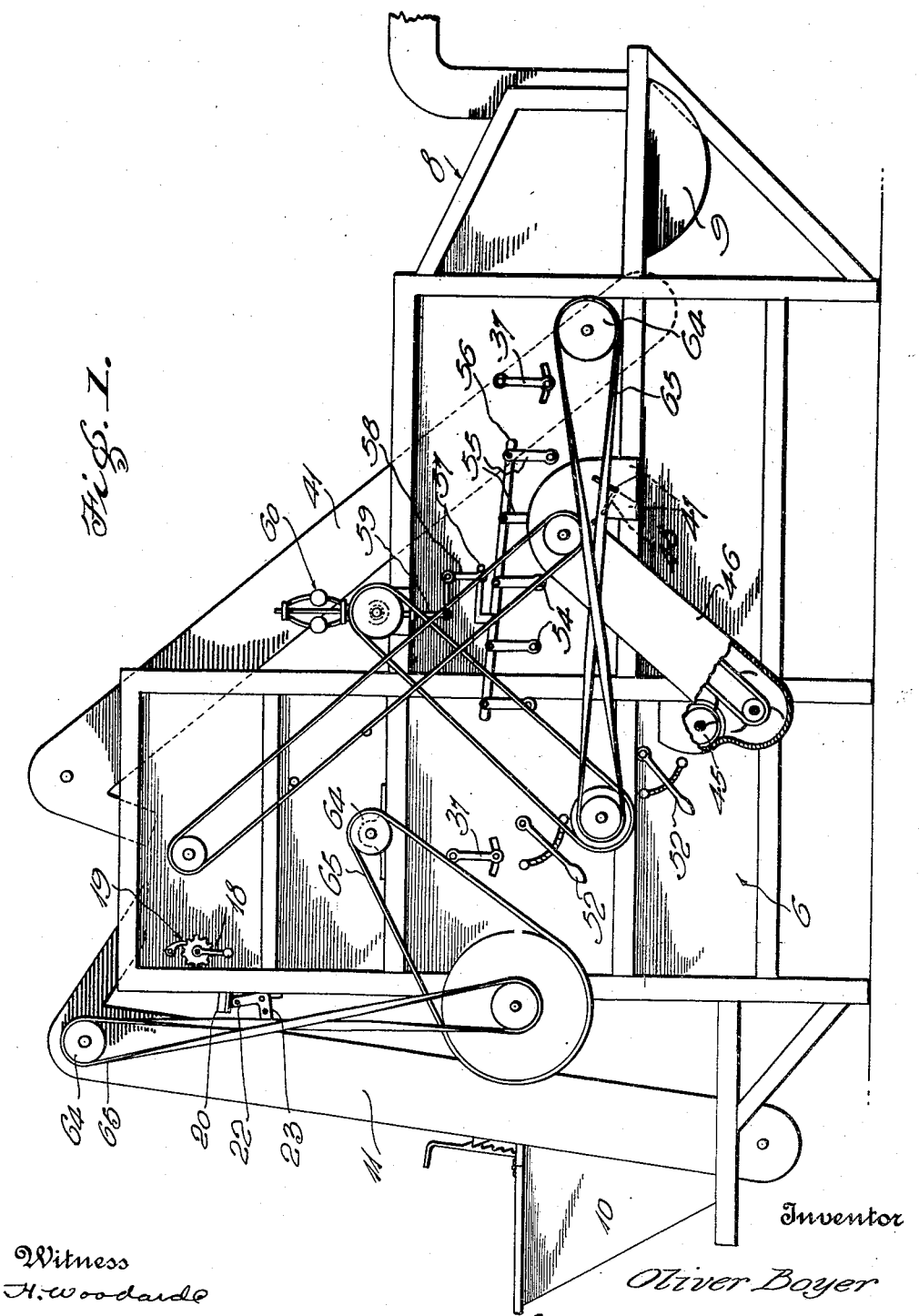
Witness
H. Woodard
Inventor
Oliver Boyer
By H. B. Wilson & Co.
Attorneys

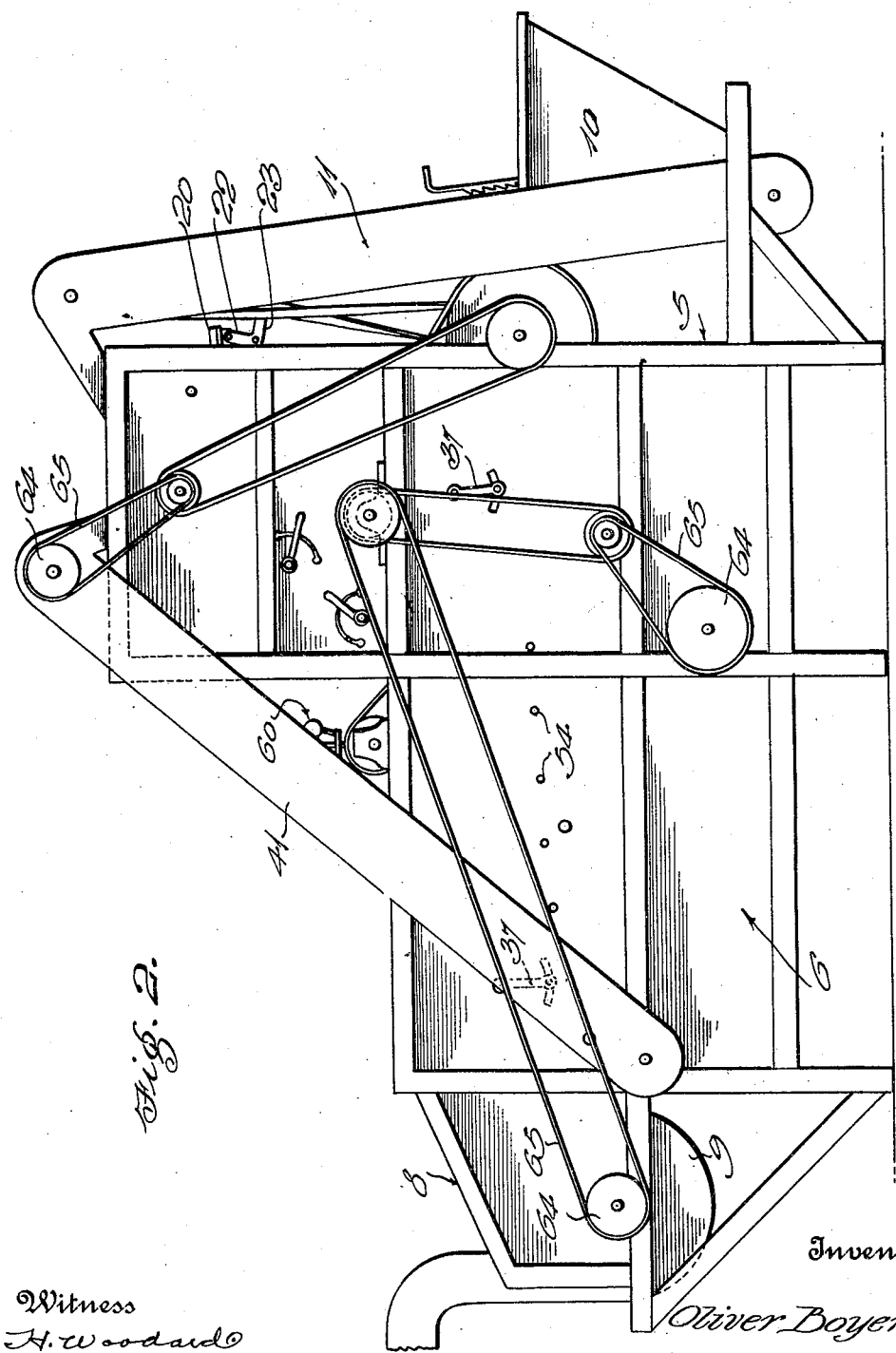

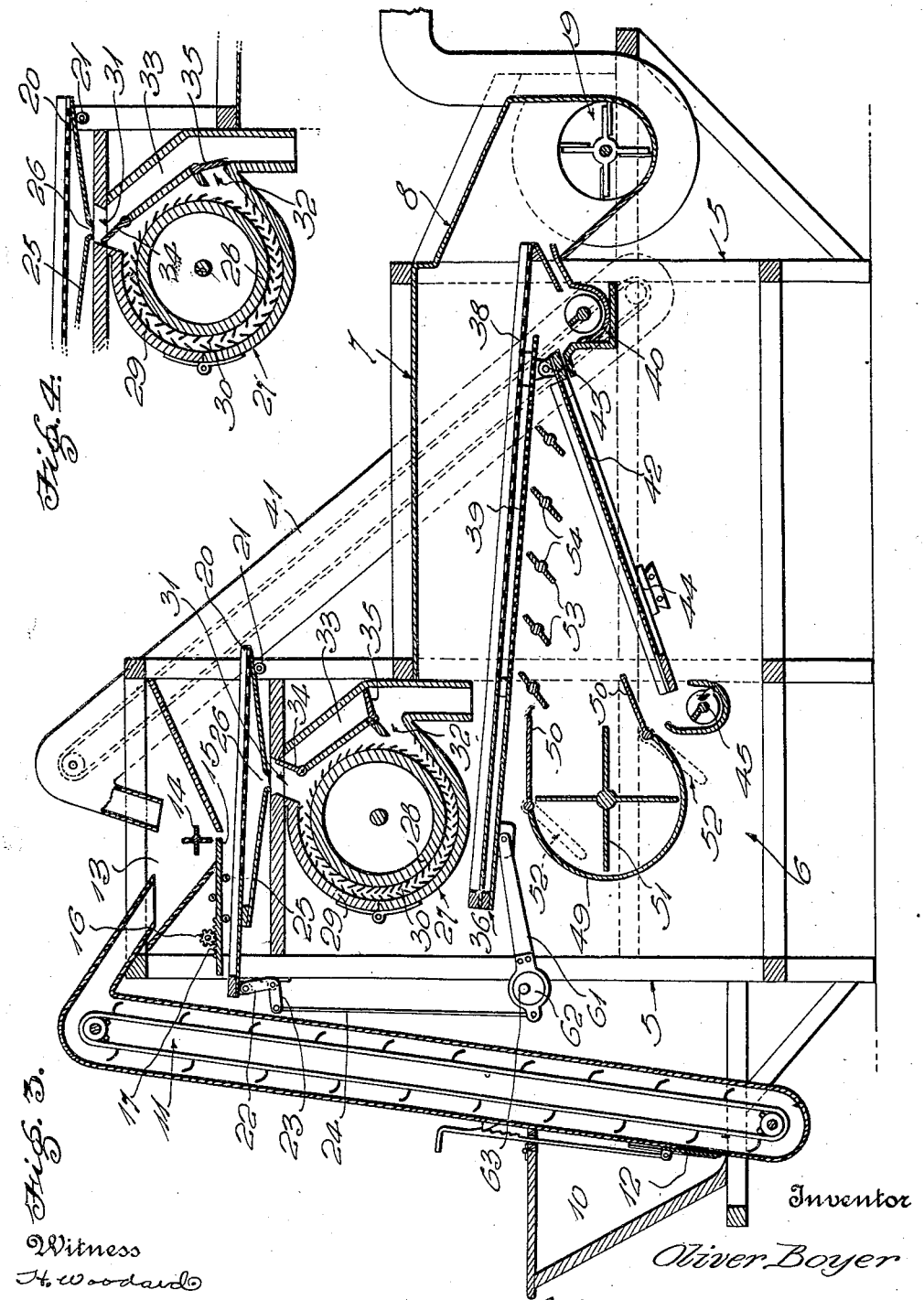

Patented Feb. 17, 1931

1,793,385

UNITED STATES PATENT OFFICE

OLIVER BOYER, OF SPENCERVILLE, OHIO

SEED AND GRAIN SCARIFIER AND CLEANER

Application filed March 1, 1928. Serial No. 258,331.

The invention relates to a new and improved machine designed primarily for scarifying and cleaning clover seed to remove all hulls therefrom, but the machine is also usable for cleaning other seed or grain.

It is one object of the invention to provide a machine of such construction as to effectively loosen the hulls and carry them off and to then thoroughly clean the seed and discharge it for sacking, provision being made whereby any of the seed still retaining the hulls will be automatically returned for retreatment, thereby producing a great saving over machines heretofore employed, in which the scarified and unscarified seed are not separated and in which all of the seed must be repeatedly run through the machine until hull-removing is complete.

The machine embodies screening means for the seed after the scarifying or hull loosening operation has been performed and it is a further object to provide novel means for directing an upward current of air through this screen, of proper strength regardless of the speed at which the machine is driven, the air current serving to prevent lodging of any chaff or hulls in the screen and serving to carry them on to a discharge means, preferably in the form of a blower.

To scarify the seed and thus loosen the hulls thereon, a concave and cylinder assembly is provided, said assembly discharging onto the screening means above mentioned, and it is a further object of the invention to provide unique means whereby the seed may be by-passed around this cylinder and concave assembly, if the machine is to be used totally for seed or grain cleaning, without performing any scarifying operation.

Yet another aim is to provide a machine which will be comparatively simple and inexpensive, yet will be efficient, reliable and in every way desirable.

With the foregoing in view, the invention resides in the novel subject matter hereinafter described and claimed, description being accomplished by reference to the accompanying drawings.

Figs. 1 and 2 are side elevations showing the opposite sides of the machine.

Fig. 3 is substantially a central vertical longitudinal sectional view.

Fig. 4 is a fragmentary sectional view similar to a portion of Fig. 3, showing the parts set for by-passing the seed or grain around the concave and cylinder assembly.

The form of construction selected for illustration in the present application, will be rather specifically described, with the understanding that within the scope of the invention as claimed, variations may be made.

The numeral 5 denotes an appropriate frame structure which carries two substantially L-shaped side walls 6, whose horizontally extending portions are connected by a top wall 7, said top wall being connected with the top of a channel-shaped hood 8 disposed at the delivery end of the machine, said hood communicating with the eye of a blower 9 which discharges the chaff, hulls and the like.

Mounted on the frame 5, at the end thereof remote from the blower 9, is a hopper 10 to receive the grain or seed to be scarified or cleaned, or both. Rising from this hopper to elevate the seed therefrom, is an appropriate elevator 11 whose inlet is controlled by a suitable adjustable valve 12. The upper end of this elevator discharges into a hopper 13 carried by the upper portion of the frame 5, and at the outlet of this hopper, an appropriate agitator 14 is provided, said outlet being controlled by a valve 15. This valve is preferably of a sliding type, controlled by a pinion 16, rack 17 and hand crank 18, and appropriate means 19 may be provided for locking the hand crank to hold the valve in desired set position.

Under the hopper 13 to receive the seed or the like therefrom, is vibratory screen 20, one end of which may well be supported by rollers or the like 21 while its other end is supported by linkage or the like 22 having an actuating arm 23 connected to the upper end of the rod 24, which rod is vertically vibrated by means hereinafter described, so as to produce horizontal vibration of the screen 20. While this screen permits all of the seed or the like to pass, it holds back all pieces of stone or other foreign matter and discharges them at its lower end. The seed passing through the screen 20 is received in a pan 25 which is connected with said screen and is provided with an outlet 26.

Under the screen 20 and pan 25, is a cylinder and concave assembly 27 whose cylinder 28 and concave 29 are provided with appropriate scarifying means 30 to loosen the hulls on the seed. This assembly 27 is provided at its upper portion with an inlet 31 to receive grain or seed from the outlet 26 of the pan 25, and below this inlet, said assembly is provided with a seed outlet 32. An angular passage 33 extends around one side of the assembly 27, from the inlet 31 to a point below the outlet 32, and said outlet opens into said passage. At the upper end of the passage 33, is a pivoted valve 34 controllable in any desired manner from the exterior of the machine. When seed or the like is to be directed into the assembly 27, the valve 34 is positioned to close the upper end of the passage 33 as seen in Fig. 3, and when valve 34 is in this position, another valve 35 which is provided for the outlet 32, is in the open position disclosed in Fig. 3, within the passage 33. Thus, the seed will pass through the assembly 27 and will discharge from the lower end of the passage 33, so that the hulls or the like on said seed are loosened by the scarifying means 30. When the machine is to be used for cleaning purposes only, the valve 34 is positioned as in Fig. 4 to direct the seed from the inlet 31, into the upper end of the passage 33. Then, the valve 35 is closed to prevent any of the seed traveling down this passage, from possibly entering the assembly 27 through the outlet 32. Like the valve 34, the valve 35 may be operated in any desired manner from the exterior of the machine.

Under the assembly 27 and declining from the latter to the hood 8, I provide vibratory screening means 36 preferably hung upon pivoted hangers 37. This screening means embodies an upper relatively coarse screen 38 and a lower comparatively fine screen 39. Both the scarified and the unscarified seed pass through the upper screen 38 but hulls and chaff remain upon the latter and feed toward the lower end thereof into the hood 8 from which they are carried off by the blower 9. Only the hull-free seed however, passes through the lower screen 39, any of the seed still bearing the hulls, being discharged from the lower end of this screen 39 into a transverse conveyor 40 which leads to an elevator 41. This elevator delivers it to the hopper 13. Thus any seed which passes through the machine without having its hulls properly scarified and removed, is returned to said hopper for retreatment.

Disposed under the screening means 36, is a sand screen 42 which declines toward the hopper 10. Preferably, the upper end of this screen is pivoted at 43 to the screening means 36, while the lower portion of said screen 42 is slidably supported by appropriate shoes or the like 44. The hull-free seed does not pass through this screen 42, but all sand and fine dirt sifts through it and is hence separated from the seed. The clean, hull-free seed is received in a transverse conveyor 45 leading to an elevator 46 having a sacking spout. In the present showing, two of these spouts 47 are disclosed, and the grain or the like may be directed into either of them by an appropriate valve 48.

Between the widely separated end portions of the screening means 36—42, is a fan housing 49 having an outlet throat formed by upper and lower adjustable plates 50, said throat opening into the space between said screening means. Within casing 49, is a fan 51 which discharges a current of air toward the blower 9, and the direction of discharge may be controlled by setting the plates 50 at desired positions, which setting may be effected by appropriate means 52.

Under the screening means 36 and in the path of the air current from the fan 51, are a number of horizontally spaced, inclined vanes 53 which serve to direct air upwardly through the screens 38—39, to prevent chaff, hulls and the like from lodging in these screens, particularly the uppermost thereof. The air which loosens the hulls and the like from the screens, carries it on to the hood 8, and this operation is assisted by the suction created by the blower 9. When the machine is being rapidly driven, the vanes 53 should be set nearer to minimum efficiency position, (in the present instance, nearer to parallel relation with the screening means 36) than when the machine is being slowly operated, and with speed decrease, said vanes should be moved in the opposite direction, (toward maximum efficiency position). Thus, regardless of the speed at which the machine be driven, it is insured that the air currents through the screening means 36, be of proper strength. I provide means for automatically effecting proper setting of these vanes, according to the speed at which the machine is being driven. In the present showing, the vanes are mounted on independent shafts 54 journaled in the side walls 6. These pivot shafts 54 are provided with arms 55 at one end, disposed in parallel relation with each other and connected pivotally with a longitudinal bar 56. By means of a link 57, one end of a bell crank lever 58 is connected with the bar 56, the other end of said bell crank being connected to the vertically movable member 59 of a ball governor 60, said governor being driven synchronously with other driven parts of the machine. As the speed of the machine increases, the member 59 actuates the parts 58—57—56—55—54—53, moving the latter toward parallel relation with the screening means 36, proportionately with the speed increase, and as decrease in speed occurs, the opposite setting of the vanes 23 is effected. Thus, at high speed of the machine, the air currents directed through the screening means 36 cannot be so strong as to blow the grain or the like therefrom into the hood 8. It is also insured that at slow speed, the air currents directed upwardly through the screening means shall be sufficiently strong to attain the desired movement of chaff and the like.

At 61, I have shown a pitman operated by an eccentric 62 and connected with the screening means 36 for vibrating the latter. The rod 24 previously described, is also connected to this pitman to be driven by the eccentric 62 for the purpose of effecting vibration of the screen 20 and pan 25. The shaft 63 of the eccentric and the various other shafts of the numerous parts to be driven, may all be connected by pulleys and belting 64—65, or in any other desired manner.

The concave 29 of the concave and cylinder assembly 27, is by preference mounted adjustably so that it may be moved into more or less close relation with the cylinder 28. However, as such adjustments could be effected by any known means and such means in itself constitutes no part of the present invention, it has not been illustrated.

I claim:—

1. A seed scarifying and cleaning machine comprising a frame having a horizontally elongated lower portion and a vertical portion rising from one end of said lower portion, opposed side walls secured to said lower portion and extending to the other end thereof, a top extending between the upper portions of said side walls from said vertical frame portion to said other end of the horizontal frame portion, a transverse suction hood secured to this end of said horizontal frame portion and communicating with the space under said top, a hopper mounted in the vertical portion of said frame, a vibratory screen mounted in this frame portion under the hopper outlet and declining toward the aforesaid top, a pan under said screen having a seed outlet in its bottom, a cylinder and concave assembly mounted in said vertical frame portion under said pan and having an inlet in communication with said pan outlet, vibratory screening means in said horizontal portion of the frame between said side walls and declining from a point under said cylinder and concave assembly to said suction hood, said screening means embodying a long and coarse upper screen whose lower end discharges into said suction hood, and a relatively short and fine lower screen, a transverse conveyor into which the lower end of said lower screen discharges and an elevator from this conveyor to said hopper, a vibratory sand screen under said screening means and declined in the opposite direction, a clean seed conveyor into which the lower end of said sand screen discharges, and a blower between the widely spaced ends of said sand screen and said screening means for directing a current of air between them.

2. In a seed cleaner, a vibratory screen, means for creating a current of air under said screen, vanes in the path of the air current for directing air upwardly through the screen, means for driving said current creating means, and speed-responsive means synchronized with said driving means for moving said vanes toward minimum efficiency position proportionately with speed increase of said current creating means.

3. In a seed cleaner, a vibratory screen, means for creating a current of air under said screen, pivotally mounted vanes in the path of the air current, a bar transverse to the vane pivots, means connecting said bar and pivots for swinging the vanes when the bar is longitudinally moved, a governor synchronized with said current creating means, and means connecting said governor with said bar to swing said vanes toward minimum efficiency position proportionately with speed increase of said current creating means.

4. In a seed cleaner, a vibratory screen, means for creating a current of air under said screen, pivotally mounted vanes in the path of the air current for directing air upwardly through the screen, arms secured to the pivots of said vanes and disposed in parallel relation with each other, a bar pivoted to said arms, a bell crank having one end connected with said bar, and a governor synchronized with said current creating means and embodying a speed-affected member connected with the other end of said bell crank, whereby to swing said vanes toward minimum efficiency position proportionately with speed increase of said current-creating means.

In testimony whereof I have hereunto affixed my signature.

OLIVER BOYER.